(12) United States Patent
Saelen et al.

(10) Patent No.: US 7,152,296 B2
(45) Date of Patent: Dec. 26, 2006

(54) SELECTIVE CUTTING ONE SHOT

(75) Inventors: Marc Saelen, Allenes-les-Marais (FR); Jean-Yves Delattre, Fournes-en-Weppes (FR); Bernard Freycon, La Neuville (FR)

(73) Assignee: Visteon Global Technologies, Inc., Van Buren Township, MI (US)

( * ) Notice: Subject to any disclaimer, the term of this patent is extended or adjusted under 35 U.S.C. 154(b) by 70 days.

(21) Appl. No.: 10/030,303

(22) PCT Filed: Mar. 22, 2001

(86) PCT No.: PCT/US01/09105

§ 371 (c)(1),
(2), (4) Date: Jun. 3, 2002

(87) PCT Pub. No.: WO01/70477

PCT Pub. Date: Sep. 27, 2001

(65) Prior Publication Data

US 2002/0162213 A1    Nov. 7, 2002

(30) Foreign Application Priority Data

Mar. 22, 2000  (FR) .................................. 00 03667

(51) Int. Cl.
  *B23P 11/02* (2006.01)
  *B29C 65/00* (2006.01)
  *B32B 37/00* (2006.01)
  *B28B 7/14* (2006.01)

(52) U.S. Cl. .................... 29/449; 29/33.5; 29/33.52; 29/243.57; 29/448; 156/228; 156/250; 493/378; 425/510

(58) Field of Classification Search ................ 29/91.1, 29/91.5, 448, 449, 33.5, 33.52, 543, 57; 83/51; 156/228, 229, 250; 264/163; 493/378; 425/292, 425/298, 510
See application file for complete search history.

(56) References Cited

U.S. PATENT DOCUMENTS

| | | | | |
|---|---|---|---|---|
| 2,796,634 A | * | 6/1957 | Chellis ....................... 264/257 |
| 4,243,456 A | * | 1/1981 | Cesano ...................... 156/214 |
| 4,865,676 A | * | 9/1989 | Kimura et al. ......... 156/244.12 |
| 4,978,407 A | * | 12/1990 | Ardissone ................... 156/216 |
| 4,991,478 A | * | 2/1991 | Riley ............................ 83/49 |
| 5,565,053 A | * | 10/1996 | Happich ..................... 156/216 |
| 5,622,667 A | * | 4/1997 | Fujiyama et al. ........... 264/266 |

(Continued)

FOREIGN PATENT DOCUMENTS

JP       63-039320       *  2/1988

(Continued)

*Primary Examiner*—Eric Compton
(74) *Attorney, Agent, or Firm*—Brinks Hofer Gilson & Lione (57) ABSTRACT

The invention relates to a process and a device for forming a planiform piece intended, in particular, for the interior fittings of motor vehicles, in which a layer of support material (1) is covered, at least on one of its faces (2) and in the area of a portion (3), at least, of its contour, or so-called portion to be bordered, with a cladding sheet (4) and said support (1) is cut along said portion to be bordered (3) in such a way that said cladding (4) projects from said support (1) in the area of said portion. According to the invention, a cutting tool (5) is pre-positioned between said cladding (4) and said support (1) along said portion to bordered (3) said cutting is effected with said cutting tool (5), when the support (1) is covered by the cladding (4).

16 Claims, 5 Drawing Sheets

U.S. PATENT DOCUMENTS 5,718,791 A * 2/1998 Spengler ..................... 156/212
5,759,594 A * 6/1998 Masui et al. ................ 425/510
6,024,150 A * 2/2000 Kawai et al. ............... 156/518
6,096,251 A * 8/2000 D'Hooren ................... 264/163

FOREIGN PATENT DOCUMENTS

JP          63-199628     *   8/1988

* cited by examiner

SELECTIVE CUTTING ONE SHOT

TECHNICAL FIELD

The invention relates to a process and a device for forming a planiform piece intended, in particular, for the interior fittings of motor vehicles.

BACKGROUND

The expression "planiform piece" is to be taken as meaning a piece the thickness of which is very considerably smaller than the other dimensions, said piece not necessarily being flat, but possibly having inwardly and/or outwardly facing deformations.

Although more especially intended for forming pieces designed for the interior trim of the bodywork of motor vehicle passenger compartments such as, for example, door panels, cabinet-work or dashboards, the invention can also be used to form pieces intended for any other field.

There are presently known pieces constituted by a support layer of fibrous material lined, on one of their faces, with a cladding sheet which borders the support along its contour.

To obtain such pieces, the support of the cladding sheet is formed, and then the support is cut out along its contour and the support is covered in such a way that the cladding projects beyond said support so it can then be tucked round.

It will be noted that such a process necessitates two manufacturing stages, one to produce the support and the other to attach the cladding sheet, which has an effect on the cost price.

SUMMARY OF INVENTION

The aim of the present invention is to provided a process and a device for forming a planiform piece, intended, in particular, for the interior fittings of motor vehicles, that remedy the aforementioned drawbacks and enable additional operations to be avoided.

Another object of the present invention is to provided a process for forming a planiform piece, intended, in particular, for the interior fittings of motor vehicles, that makes it possible to succeed in cutting the support while minimising the risks of flash or tearing.

A further aim of the present invention is to provide a process for forming a planiform piece intended, in particular, for the interior trim of motor vehicles that enables the cladding of the piece formed to be preserved.

Further aims and advantages of the invention will emerge in the course of the following description, which is given only by way of illustration and is not intended to limit same.

The invention relates firstly to a process for forming a planiform piece intended, in particular, for the interior fittings of motor vehicles, in which a layer of support material is covered, at least on one of its faces and in the area of a portion, at least, of its contour, or so-called portion to be bordered, with a cladding sheet and said support is cut along said portion to be bordered in such a way that said cladding projects from said support in the area of said portion, characterised by the fact that a cutting tool is pre-positioned between said cladding and said support along said portion to be bordered and said cutting is effected with said cutting tool, when the support is covered by the cladding.

The invention also relates to a device for forming a planiform piece intended, in particular, for the interior fittings of motor vehicles, including:

means for covering a layer of support material, on at least one of its faces and in the area of a portion, at least, of its contour, or so-called 'portion to be bordered', with a cladding sheet, through the change over of said means for covering the support from a first configuration to a second configuration.

means for cutting said support along said portion to be bordered in such a way that said cladding projects beyond said support in the area of said portion, said cutting means being constituted by a cutting tool, suitable for being positioned between said cladding and said support, along said portion to be bordered, and for permitting cutting when the means for covering the support change from their said first to their said second configuration.

BRIEF DESCRIPTION OF DRAWINGS

The invention will be more readily understood from a study of the following description, accompanied by the annexed drawings, which form an integral part thereof, and wherein.

DETAILED DESCRIPTION OF INVENTION

The invention relates firstly to a process for forming a planiform piece.

As illustrated in FIGS. 1 to 4, according to the process of the invention, a layer of material, in particular fibrous material, defining a support 1 is covered by a cladding sheet 4 on at least one of its faces 2 and in the area of a portion 3, at least, of its contour, or so-called 'portion to be bordered'.

Said support is intended, for example, to impart its form to the piece thus obtained, while cladding 4 serves, in particular, to enhance its appearance. The latter is constituted, for example, by a multi-layer material including, in particular, a thickness of non-woven fabric, a thickness of foam and a thickness of textile. Said cladding 4 is provided, for example, over the entire surface of said face 2 and/or over all of its contour.

Said support 1 is cut along said portion to be bordered 3 in such a way that said cladding 4 projects beyond said support 1 in the area of said portion 3.

For this purpose, a cutting tool 5 is pre-positioned between said cladding 4 and said support 1 along said portion to be bordered 3 and said cutting is carried out with said cutting tool 5 when support 1 is covered by cladding 4.

It will be noted that, according to the invention, selective cutting is thus performed making it possible to avoid damaging the cladding and not to have to perform an additional operation on the piece in order to cut the support.

Figure 5:
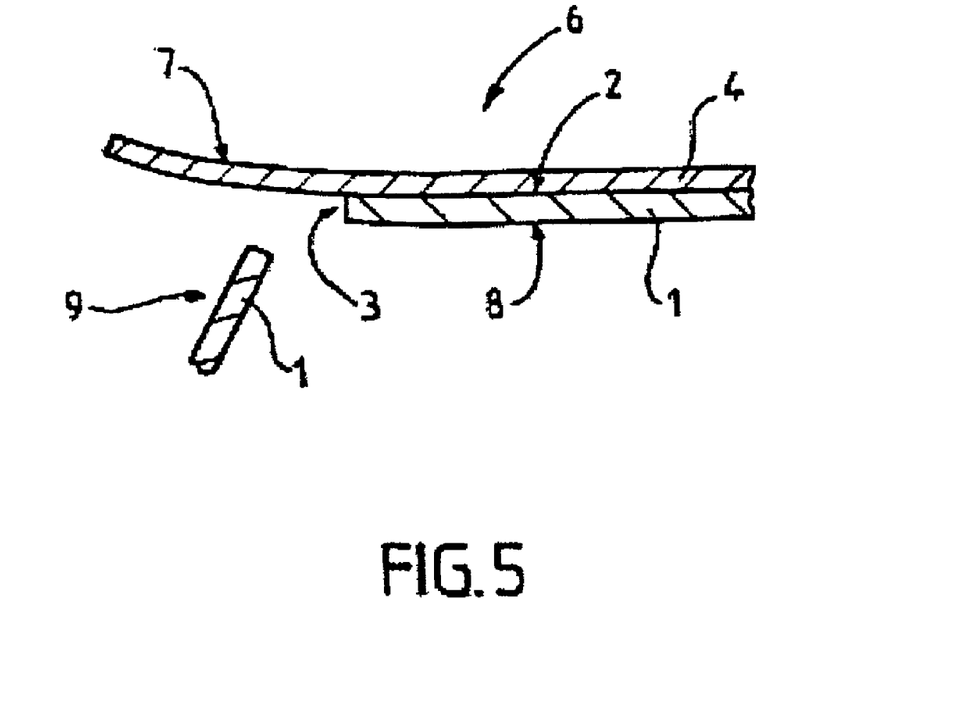
FIG. 5 is an enlarged view of a portion, bearing the number 5 in the preceding figures, of an example of a piece obtained through the process according to the invention.

As illustrated in FIG. 5, there is obtained a piece 6 constituted by said support 1 and said cladding 4. The latter projects beyond said support 1 along said portion to be bordered 3 of its contour, in the area of a portion, bearing the number 7, which is thus available to be tucked round on the opposite face 8 of said support 1. The cut off portion, numbered 9, of the latter is discharged elsewhere.

This operation is conducted, for example in a mould 10 comprising a punch 11 and a die 12, defining between them an air gap 13. The latter has, for instance, the dimensions and/or the profile of the piece to be formed.

Said punch 11 and said die 12 are movable towards one another to enable the mould to be closed in a so-called 'forming' direction 14.

In said mould 10 said support 1 and said cladding 4, are positioned, for example, between said die 12 and said punch 11. Said support 1 and said cladding 4, placed facing one another in said forming direction, are each constituted by a first zone 15a, located in air gap 13, and by a second zone 15b, extending beyond said air gap 13.

Said second zone 15b of said support 1 is designed to constitute, for example, said cut off portion 9. It is provided, in particular, all along said portion to be bordered 3. The second zone 15b of said cladding 4 is intended to constitute, for example, projecting portion 7.

In said mould 10, said cutting tool 5 is also positioned, in the vicinity of the limit between said first zone 15a and said second zone 15b of said support 1 and/or of said cladding 4. Said cutting tool 5 is thus set in place as close as possible to said support 1 and/or said cladding 4.

Said support 1 and said cladding 4 are adhered to one another by closing said mould, in said forming direction 14, said support 1 and said cladding 4 being possibly formed simultaneously, according to the profile given to air gap 13. For this purpose, thermocompression is used.

Cutting and closing of the mould can advantageously by coordinated by controlling the path of cutting tool 5 in relation to the relative path of die 12 and of punch 11 in such a way as to complete these two operations simultaneously. In other words, said cutting will be carried out at the end of the closing movement of mould 10 in said direction 14.

When the mould is closed said support 1 or said cladding 4 is held in position, for example, by means of said cutting tool 5 against punch 11 or die 21, in the area of their said second zone 15b, so as to control their movement in the planes orthogonal to said forming direction 14.

Figure 1A:
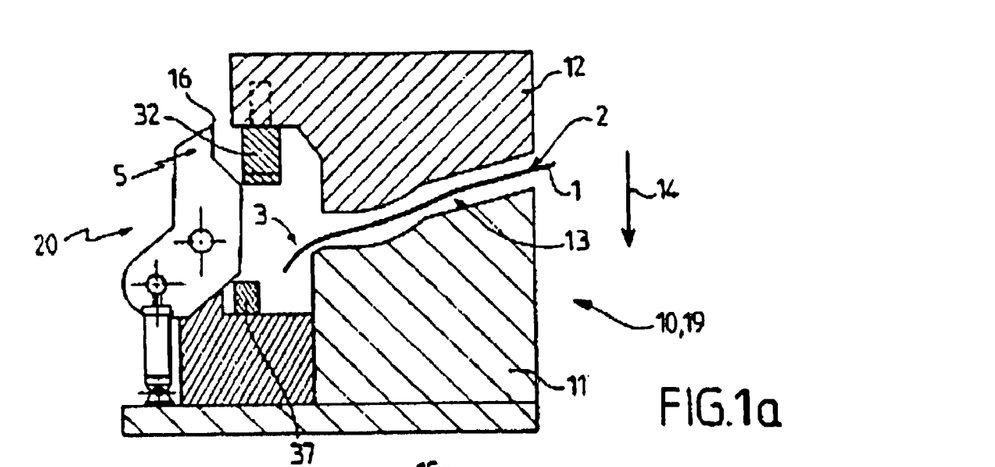
FIGS. 1a to 1c illustrate, in cross-section, the different steps in a first exemplary embodiment of the process according to the invention.
Figure 1B:
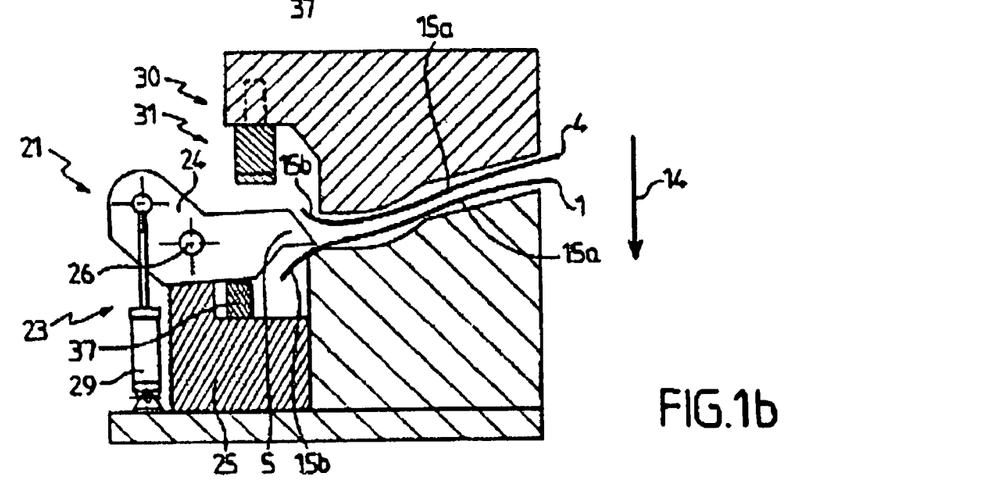
Figure 1C:
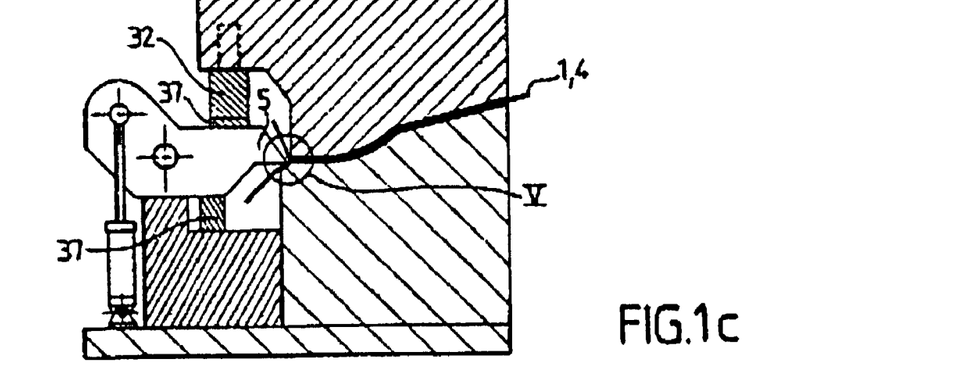
Figure 2A:
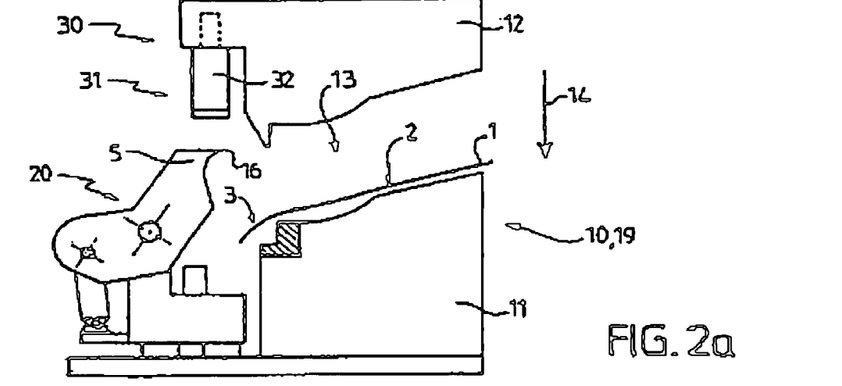
FIGS. 2a to 2c illustrate, in cross-section, the different steps in a second exemplary embodiment of the process according to the invention.
Figure 2B:
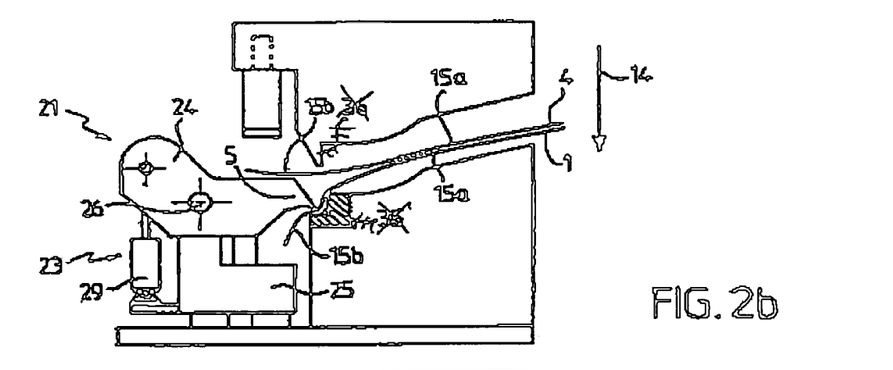
Figure 2C:
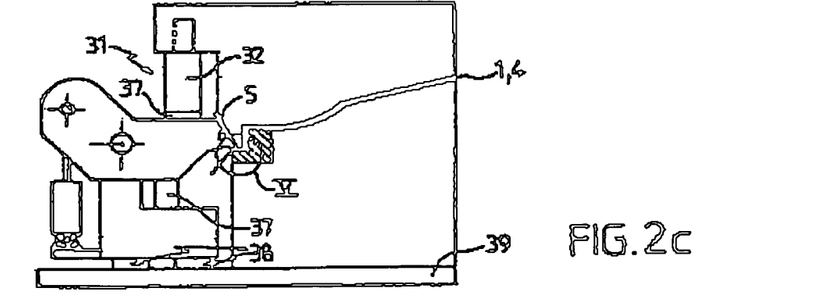
Figure 3A:
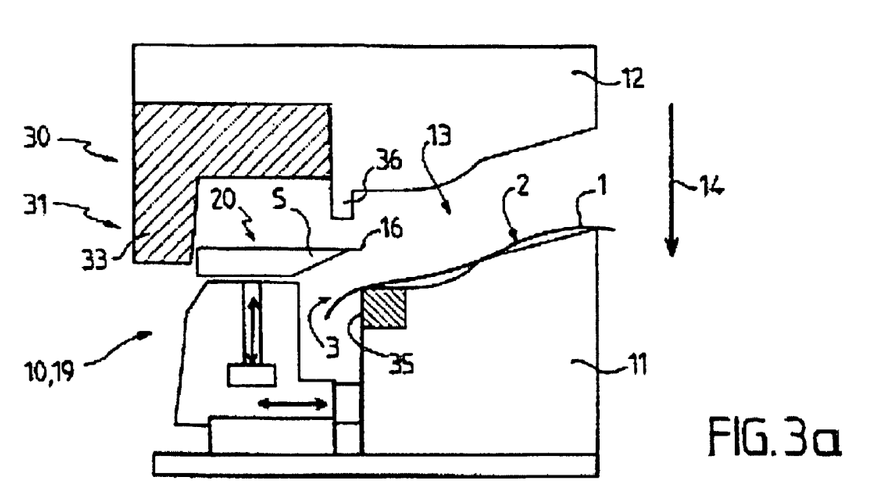
FIGS. 3a and 3c illustrate, in cross-section, the different steps in a third exemplary embodiment of the process according to the invention.
Figure 3B:
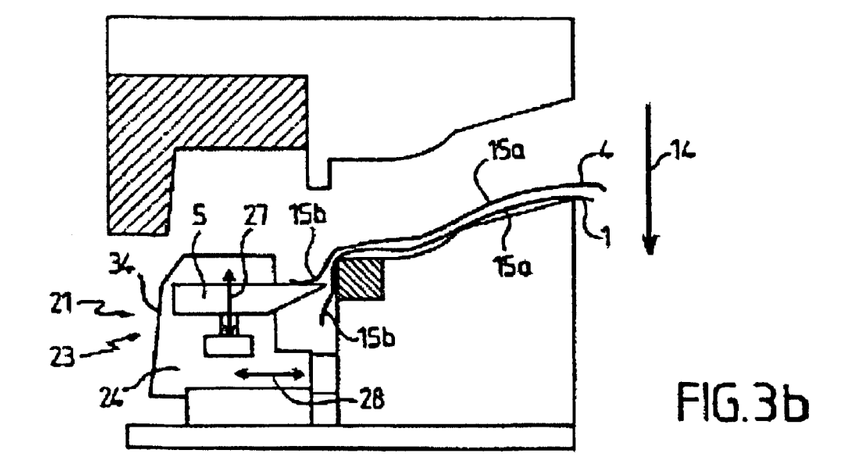
Figure 3C:
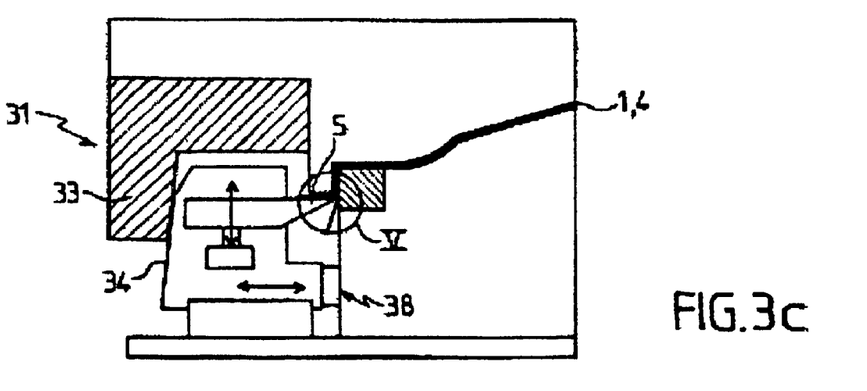

More precisely, as illustrated in FIGS. 1 to 3, said support 1 can be held in position against punch 11 by applying a cutting portion 16 of said cutting tool with controlled pressure against said punch 11, to obtain a sliding contact of said support between the latter. For cutting purposes, a pressure increment is then applied to said cutting portion 16 of said cutting tool 5. The positioning clearances of said support 1 are thus reduced.

To obtain said pressure increment, said punch 11 and/or said die 12 is/are moved towards one another, when the mould is closed, and the amount of movement of said punch 11 and/or of said die 12 originating from the closing of the mould is applied, for example, directly or indirectly to said cutting tool 5. It is thus unnecessary to have any other source of energy to activate the cutting tool.

It should be noted that the use of the amount of movement of punch 11 and/or of die 12 could also be contemplated without cutting tool 5 having previously been placed in contact with support 1.

Figure 4A:
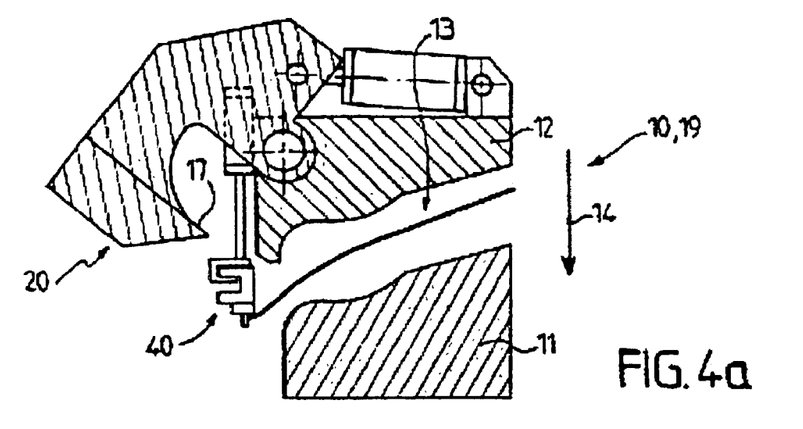
FIGS. 4a to 4c, illustrate, in cross-section, a fourth exemplary embodiment of the process according to the invention.
Figure 4B:
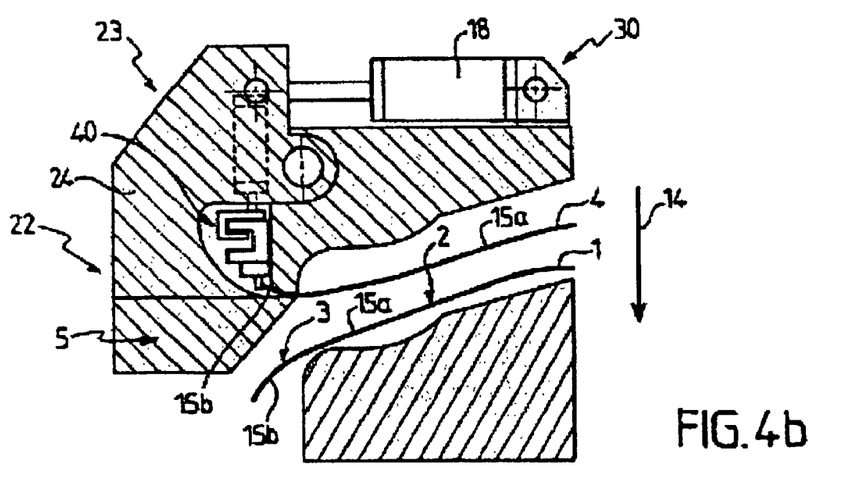
Figure 4C:
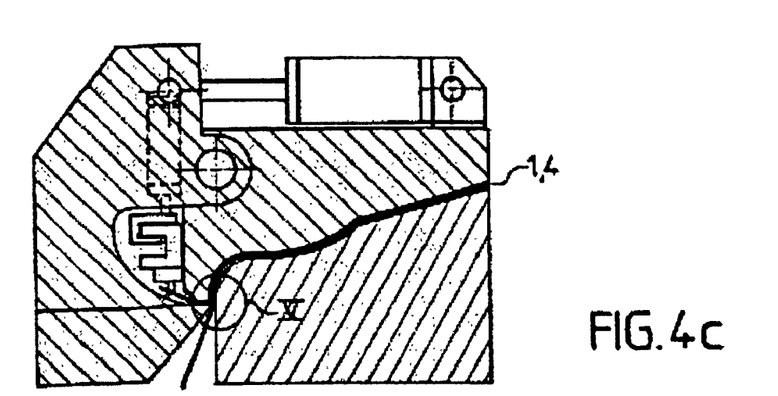

As illustrated in FIG. 4, according to another form of embodiment, said cladding 4 is held in position against said die 12 by pinching between a non-cutting portion 17 of said cutting tool 5 and said die 12. A frame 40 can also be used. The energy for cutting is then imparted by a jack 18, acting, directly or indirectly, on said cutting tool 5 and secured to said die 12, after the closing of mould 10.

As illustrated in FIGS. 2 and 3, said support 1 may possibly be wedged, in the area of the limit between said first zone 15a and said second zone 15b, against said punch 11, prior to cutting. According to other forms of embodiment, forming against die 12 can also be carried out.

By way of a non-limitative example, according to the different forms of embodiment illustrated, support 1 or cladding 4 is placed in air gap 13, said cutting tool 5 is then placed in contact with said support 1 or said cladding 4, and then cladding 4 or support 1, respectively, is inserted between cutting tool 5 and the other portion of the mould. The latter is then closed, which drives said cutting tool 5, at the very least according to the exemplary embodiments of FIGS. 1 to 3.

The invention also relates to a device for forming a planiform piece, in particular for implementing the process described above.

It includes means 19 for covering a layer of support material 1, on at least one of its faces 2 and in the area of a portion, at least, of its contour, or so-called portion to be bordered 3, with a cladding sheet 4, through the changeover of said means 19 from a first configuration, the open position of mould 10, illustrated in FIGS. 1a, 1b, 2a, 2b, 3a, 3b and 4a, 4b, to a second configuration, the closed position of mould 10, illustrated in FIGS. 1c, 2c, 3c and 4c.

Said device also includes means 20 for cutting said support 1 along said portion to be bordered 3, in such a way that said cladding 4 projects beyond said support 1.

Said cutting means 20 are constituted by a cutting tool 5 capable of being positioned between said cladding 4 and said support 1, along said portion to be bordered 3, and of permitting cutting, when covering means 19 change over from their said first to their said second configuration.

Said means 19 for covering support 1 are constituted, for example, by a mould 10 comprising a punch 11 and a die 12 defining between them an air gap 13. Said punch 11 and said die 12 are movable towards one another to enabling the mould 10 to close in a direction 14, or so-called forming direction.

Said support 1 and said cladding 4 can thus be adhered to one another by closing said mould 10 in said forming direction 14.

Mould 10 further comprises, in particular, means 21 for positioning said support 1 and/or means 22 for positioning said cladding 4, capable of permitting their placing in such a way that said support and said cladding are placed facing one another in said forming direction and are each constituted by a first zone 15a located in air gap 13 and by a second zone 15b extending beyond said air gap 13.

Said mould 10 further comprises means 23 for positioning said cutting tool 5, capable of permitting its placing in the vicinity of the limit between said first zone 15a and said second zone 15b of said support 1 and/or said cladding 4.

As described more fully below, means 37 co-operate to permit the simultaneous completion of the cutting of support 1 by the cutting means and the closing of the mould.

Said means 21 for positioning support 1 or said means 22 for positioning cladding 4 are constituted, in particular, by said cutting tool 5. The latter can, in fact, possibly be capable of holding said support 1 or said cladding 4 in position, when the mould closes, against punch 11 or die 12, in the area of their said second zone 15b, so as to control their movement in planes orthogonal to forming direction 14.

Said means 23 for positioning cutting tool 5 are constituted, for example, by a means 24 supporting said cutting tool and an intermediate member 25, in relation to which said cutting tool 5 is articulated, with said intermediate member 25 co-operating directly or otherwise with punch 11 or die 12.

As illustrated in FIGS. 1, 2 and 4, said means 24 supporting the cutting tool is articulated, for example, in rotation in relation to said intermediate member 25 about an axis 26. According to another form of embodiment, as illustrated in FIG. 3, this can also involve deflection in translation in directions 27, 28 substantially parallel and/or orthogonal to said forming direction 14.

As illustrated in FIGS. 1 and 2, said means 21 for positioning support 1 are constituted, for example, by said cutting tool 5, capable of coming to bear against said punch 11 and said means 23 for positioning cutting tool 5 further include a jack, or ram, 29, acting on said means 24 supporting the cutting tool, so as to permit sliding contact of said support 1 between a cutting portion 16 of said cutting tool 5 and said punch 11. Said jack 29 of means 23 for positioning the cutting tool is secured, in particular, to said intermediate member 25.

Said mould 10 comprises means 30 for applying a pressure necessary for said cutting portion 16 of said cutting tool 5, for cutting purposes.

Advantageously, as illustrated in FIG. 1, punch 11, intermediate member 25 and support 24 for cutting tool 5 are in direct contact with one another. Such a configuration facilitates heat exchange between them. Consequently, the expansion phenomena are distributed among each of them, which makes it possible to reduce uncertainty as to positioning.

This being the case, as illustrated in FIGS. 1 to 3, the device according to the invention can include, for cutting purposes, pressing means 31 to apply to said support 24 for cutting tool 5 and/or to said cutting tool 5 itself, the amount of movement of said punch 11 originating from the closing of mould 10. According to other forms of embodiment, not illustrated, this can involve, alternatively or cumulatively, the amount of movement of die 12.

As illustrated in FIGS. 1 and 2, said pressing means 31 are constituted, for example, by stops 32, secured to said die 12 and extending towards punch 11, outside air gap 13, so as to be able to come to bear against support 24 for cutting tool 5 and/or cutting tool 5 itself, when the mould closes.

As illustrated in FIG. 3, said pressing means 31 can be constituted, for instance, by a wedge, or corner piece, 33 co-operating with an inclined plane 34 provided parallel on said support 24 of cutting tool 5, said wedge 33 being secured to said die 12 and said plane 34 being slightly inclined in relation to said forming direction 14.

It will be noted that, according to the different forms of embodiment mentioned earlier, said means 30 for applying the pressure necessary for cutting and said pressing means 31 are possibly one and the same and act when said cutting tool 5 bears against said support 1, itself bearing on punch 11.

In FIG. 3, said wedge 33 even serves to position support 1 against punch 1 when the mould closes. More precisely, the movements of the cutting tool in direction 28 orthogonal to forming direction 14 are obtained by said wedge 33; through co-operation with said inclined plane 34, while their movements in direction 27 parallel to said forming direction 14 can be obtained using independent means.

According to other forms of embodiment, not illustrated, said pressing means 31 can be used without cutting tool 5 serving to position said support 1 against said punch 11.

As illustrated in FIG. 4, said means 22 for positioning cladding 4 are constituted, for example, by said cutting tool 5, which is intercalated between said cladding 4 and said support 1 and, being provided with a non-cutting zone 17, is capable of pinching said cladding 4 against said die 12. Said mould 10 is then provided with a jack 18, secured, in particular, to said die 12, to apply the force required for cutting to support 24 of said cutting tool 5 and, subsequently, to said cutting tool 5 itself.

Again in the same figures, as well as in FIG. 1, it will be noted that wedges 37, secured to support 24 of cutting tool 5 and/or to stop 32, can co-operate to complete the closing of the mould and the cutting operation simultaneously.

Means 38 are constituted, in particular, by elastic return means, located between a fixed point on the mould and support 24 of said cutting tool and/or said intermediate member 25, so as to restore it to the initial position.

According to the form of embodiment illustrated in FIG. 2, said elastic return means are located between said intermediate member 25 and a base 39 of mould 10. The elements of the assembly formed by support 24 of said cutting tool 5, said intermediate member 25 and said jack 29 acting on said support 24 for said cutting tool 5 are then movable in relation to said base 30.

In the case of a mould 10 intended to form a part having a portion 3 to be bordered on several of its sides, a said cutting tool 5, as well as said means 21, 22, 23 for positioning said support 1, said cladding 4 and said cutting tool 5 are used in the area of each of the sides of the mould intended to receive said portion to be bordered 3. Several jacks 18, 29 can be provided along each of said sides to actuate said cutting tools 5 and/or their supports 24.

Other forms of embodiment, with the grasp of a person skilled in the art, could, of course, have been contemplated without thereby departing from the scope of the invention.

The invention claimed is:

1. A device for forming a planiform piece having a support material and a cladding sheet intended for the interior fittings of motor vehicles, the device comprising:
   a mould including a punch and a die for covering the support material, on at least one of its faces with a cladding sheet, wherein an air gap is defined between the punch and the die and the punch and the die are movable towards one another to permit the closing of the mould in a forming direction and wherein the support material and cladding have a first zone located in the air gap and a second zone projecting from said air gap;
   a pivotable member;
   an intermediate member rotatably securing the pivotable member with respect to the die;
   a jack fixedly mounted at a first end to the intermediate member and pivotably secured at a second end to the pivotable member;
   a cutting tool mounted to the pivotable member for cutting the support material, the cutting tool is positionable between the cladding and the support material in the vicinity of the limit between the first zone and the second zone by the pivotal movement of the pivotable member, and
   wherein the pivotable member cooperates with the die to simultaneously cut and form the planiform piece when the mould moves from a first to a second configuration.

2. The device according to claim 1, wherein the mould further comprises at least one stop mounted to one of the punch and the die outside the air gap for pressing on the pivotable member when the mould is in the second configuration.

3. The device according to claim 2, further comprising at least two stops wherein one of the at least two stops is mounted to the punch and the other of the at least two stops is mounted to the die outside the air gap for pressing on the pivotable member when the mould is in the second configuration.

4. The device according to claim 1, wherein the cutting tool further comprises a non-cutting portion for contacting the cladding sheet and holding the cladding against the die as the die is moved toward the punch.

5. The device according to claim 1, further comprising a frame attached to the mould for contacting the cladding sheet and holding the cladding against the die as the die is moved toward the punch.

6. The device according to claim 5, wherein the frame is attached to the jack, wherein the jack is attached to mould for actuating the frame to contact the cladding sheet and hold the cladding against the die as the die is moved toward the punch.

7. The device according to claim 1, further comprising elastic return means located between a fixed point on the mould and the pivotable member to restore pivotable member to an initial position.

8. The device according to claim 1, further comprising elastic return means located between a fixed point on the mould and the intermediate member to restore intermediate member to an initial position.

9. A method for forming a planiform piece having a support material and a cladding sheet intended for the interior fittings of motor vehicles, the method comprising:
covering the support material on at least one of its faces with a cladding sheet using a mould including a punch and a die, wherein an air gap is defined between the punch and the die and the punch and the die are movable towards one another to permit the closing of the mould in a forming direction and wherein the support material and cladding have a first zone located in the air gap and a second zone projecting from said air gap;
positioning a cutting tool between the cladding and the support material in the vicinity of the limit between the first zone and the second zone by the pivotal movement of a pivotable member wherein the pivotable member is rotatably secured to an intermediate member and wherein the intermediate member is fixedly secured to the die;
actuating a jack fixedly mounted at a first end to the intermediate member and pivotably secured at a second end to the pivotable member; and
cutting the support material with the cutting tool mounted to the pivotable member, wherein the pivotable member cooperates with at least one of the punch and the die to simultaneously cut and form the planiform piece when the mould moves in the forming direction.

10. The method according to claim 9, further comprising pressing on the pivotable member when the mould is moving in the forming direction with at least one stop mounted to one of the punch and the die outside the air gap.

11. The method according to claim 10, wherein pressing on the pivotable member further comprises pressing on the pivatable member when the mould is moving in the forming direction with at least two stops wherein one of the at least two stops is mounted to the punch and the other of the at least two stops is mounted to the die outside the air gap.

12. The method according to claim 9, further comprising contacting the cladding sheet and holding the cladding against the die as the die is moved toward the punch.

13. The method according to claim 12, wherein contacting the cladding sheet and holding the cladding further comprises contacting and holding the cladding with a frame attached to the mould.

14. The method according to claim 13, wherein contacting and holding the cladding using the frame further comprises actuating the frame to contact the cladding sheet and held the cladding against the die as the die is moved toward the punch using the jack.

15. The method according to claim 9, further comprising restoring the pivotable member to an initial position using an elastic return means located between a fixed point on the mould and the pivotable member.

16. The method according to claim 9, further comprising restoring the intermediate member to an initial position using elastic return means located between a fixed point on the mould and the intermediate member.

* * * * *